Patented Nov. 6, 1928.

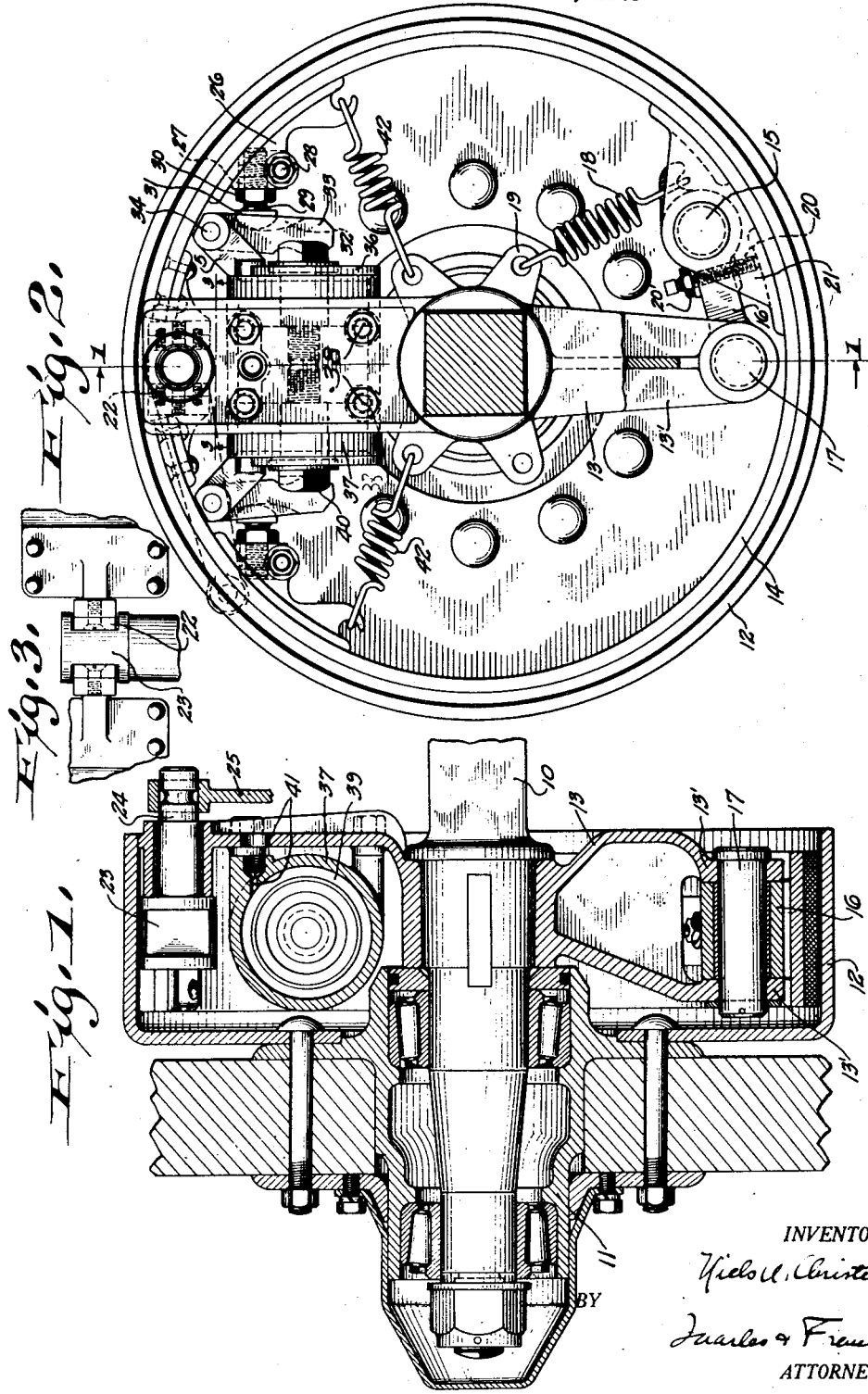

1,690,855

UNITED STATES PATENT OFFICE.

NIELS A. CHRISTENSEN, OF CLEVELAND, OHIO.

BRAKE.

Application filed March 29, 1926. Serial No. 98,230.

The invention relates to vehicle brakes.

In the operation of vehicles, especially the trailer vehicles of an automotive train, it is desirable to operate all the brakes of these trailer vehicles simultaneously when made up in a train, and to operate the brake of each vehicle independently when detached from the train, and in other instances where the brake is operated by fluid pressure it is desirable to provide means for operating the brake by other means in case of an emergency. The object, therefore, of the present invention is to provide a vehicle brake apparatus wherein a fluid-pressure-operated motor and a manually-operated means are associated with a brake member, more particularly of the internal expanding band type.

A further object of the invention is to provide certain modifications in the brake mechanism in my copending application Serial No. 97,663, filed March 26, 1926.

The invention further consists in the several features hereinafter set forth and more particularly defined by claims at the conclusion hereof.

In the drawings, Fig. 1 is a vertical sectional view taken on the line 1—1 of Fig. 2, of brake mechanism embodying the invention;

Fig. 2 is a rear end view of the brake mechanism;

Fig. 3 is a detail view partly in section taken along the line 3—3 of Fig. 2.

Referring to the drawings, the numeral 10 designates the wheel axle, here shown as relatively fixed, 11 the wheel hub, 11' the spokes of the wheel, 12 the brake drum secured to said hub, and 13 a brake support or spider secured to the axle.

The brake member 14 is in the form of an internal expanding band which is pivotally connected intermediate its ends by an anchor pin 15 to one end of an anchor pin link 16 which is pivotally connected at its other end by a pin 17 to the forked arms 13' of the support 13.

The intermediate part of the band 14 is moved to release position by a spring 18 connected at the free end of the link and to a lug 19 on said support 13, and the release position thereof is determined by an adjustable set-screw 20 mounted on said link and engageable with the pivot support 21 of said band and locked by a locknut 20'.

The upper ends of the band 14 are provided with hardened steel wear-blocks 22 engageable with an oscillatory spreader cam 23 journalled in the support 13 and having a shaft extension 24 provided with an arm 25 for connection with a suitable manually-operated lever (not shown).

Below the ends of said band, lugs or brackets 26 are provided, having split bosses each receiving a split bushing 27 which is clamped thereto by a bolt 28 and has threaded engagement with an abutment in the form of a jackscrew 29 and a nut-head 30 on its outer end. A more detailed showing and description of this adjustable connection will be found in my copending application Serial No. 703,952, filed April 3, 1924. Each jackscrew has an elongated flat head 31 engageable in a slot 32 in the intermediate portion of a lever 33. Each lever 33 is pivotally mounted on a pin 34 carried in spaced arms 5 formed integral with a brake cylinder cover 36 which is bolted to the brake cylinder 37 connected by bolts 38 to the support 13.

The brake cylinder 37 has a pair of suitably packed pistons 39 working therein in opposite directions, and each piston has a rod provided with an exteriorly-disposed head 40 which is slotted to receive the outer end of the lever 33. Pressure fluid is introduced into or released from the brake cylinder through a port 41.

The free ends of the band are moved to a release position by means of springs 42, each connected at one end to the bracket 16 and at the other end to lugs 43 on the support 13.

With this construction, oscillating the cam 23 will move the free ends of the band 14 and the intermediate portions thereof into engagement with the brake drum 12, and bringing the cam back to an inoperative position permits the springs 18 and 42 to release the band from said drum. Also, introduction of fluid pressure into the brake cylinder 37, between the pistons 39, causes their outward movement and hence an outward swinging movement of the levers 33 to move the free ends of the band and the intermediate portions thereof into braking engagement with said drum, and upon the release of fluid pressure the springs 42 and 18 release the band from the drum. Furthermore, the slots 32 and those in the head of the rods 40 are so disposed as to prevent lateral movement of said band 12 relative to said drum and the faces of the cam spreader.

The adjustment of the position of the screw 20 relative to the pivot support 21 on the band determines the release position of the intermediate part of the band, and the adjustment of the jackscrews 29 may determine the release position of the free end portions of the band, although the cam spreader 23 itself, when not in use, forms an abutment that would determine an initial release position of the free ends of the band.

I desire it to be understood that this invention is not to be limited to any particular form or arrangement of parts except in so far as such limitations are specified in the claims.

What I claim as my invention is:

1. In a vehicle brake mechanism, the combination with a rotatable brake drum, a brake support, a brake associated with said support and engageable with the interior surface of said drum, a manually operable oscillatory expander journalled on said support and engageable with an end of the brake to move it into braking engagement with said drum, a fluid-pressure-operated motor mounted on said support and provided with a thrust member, guide and thrust connections between said thrust member and brake adjacent the end thereof, said guide and thrust connections serving to keep said brake in alined position relative to said expander and drum.

2. In a vehicle brake mechanism, the combination with a rotatable brake drum, a brake support, a brake associated with said support and engageable with the interior surface of said drum, a manually operable oscillatory expander journalled on said support and engageable with an end of the brake to move it into braking engagement with said drum, a fluid-pressure-operated motor mounted on said support and provided with a thrust member, a lever having a guide and thrust connection with said thrust member, and a guide and thrust connection between said lever and brake adjacent said end whereby said brake is maintained in alined position relative to said expander and drum.

In testimony whereof, I affix my signature.

NIELS A. CHRISTENSEN.